June 5, 1962 M. A. ZINIUK ET AL 3,037,383
INDICATING SYSTEMS
Filed Sept. 5, 1958 2 Sheets-Sheet 1
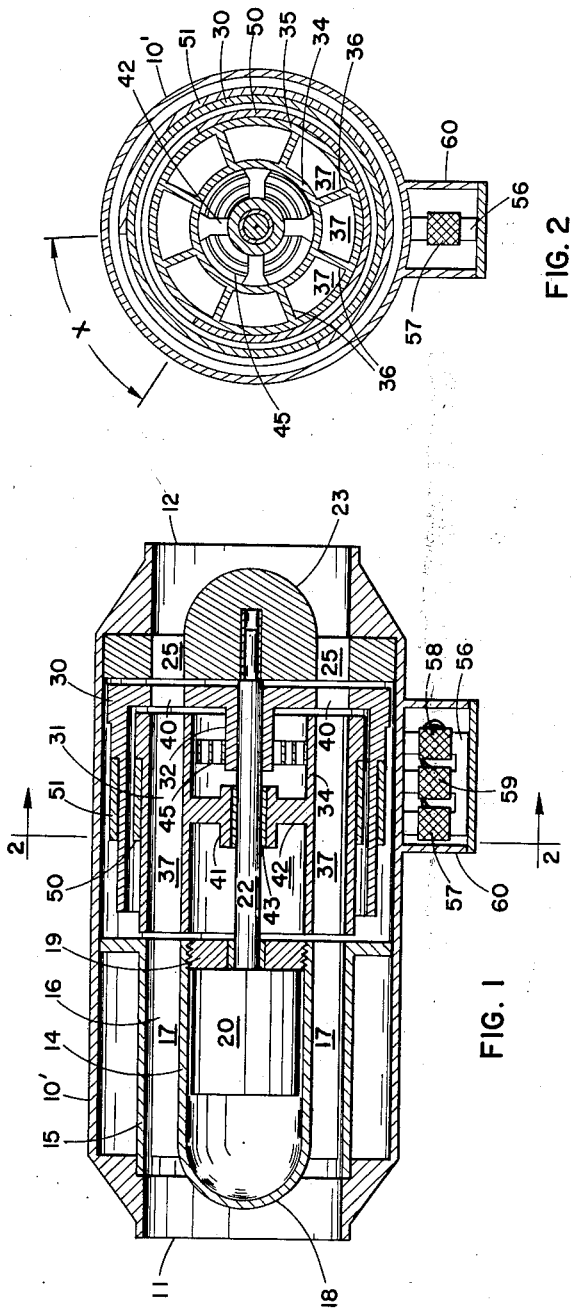
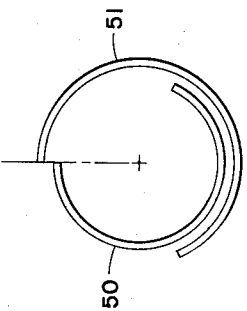
INVENTORS
MICHAEL A. ZINIUK
WALTER E. CHAPELLE
BY
ATTORNEY June 5, 1962 M. A. ZINIUK ET AL 3,037,383
INDICATING SYSTEMS
Filed Sept. 5, 1958 2 Sheets-Sheet 2

INVENTORS
MICHAEL A. ZINIUK
WALTER E. CHAPELLE
BY
*Grover G. Frater*
ATTORNEY

3,037,383
INDICATING SYSTEMS
Michael A. Ziniuk, Melvindale, and Walter E. Chapelle, Plymouth, Mich., assignors to The Bendix Corporation, a corporation of Delaware
Filed Sept. 5, 1958, Ser. No. 759,321
3 Claims. (Cl. 73—194)

This invention relates to improvements in indicating systems in which the variable to be indicated is represented by a time interval.

While not limited thereto, the invention is especially applicable to rate of fluid flow indicating systems wherein it contributes to accurate indication of flow rate and mass flow rate in particular, with substantial dependability by electrical means substantially independent, if necessary, of the frequency and amplitude of the electrical supply sources. Provision of novel means for realizing these advantages is an object of the invention.

Another object is to provide a novel rate of fluid flow indicating system for aircraft, and especially to provide an aircraft system which does not require a high degree of electrical power source frequency stability whereby to make unnecessary the weight adding, space consuming, frequency regulators which have heretofore been required in manned and unmanned air vehicles.

In achieving these advantages, the magnitude of the variable quantity to be indicated is represented as an interval of time. A signal of this duration is compared with the duration of a signal whose duration represents the indicated magnitude of the variable. A signal proportional to the difference in duration of the compared signals is applied to and actuates the indicator.

In the indication of fluid flow rate, the flow rate is measured as a time interval and advantageously, as in the form of the invention selected for illustration, is represented as the duration of an electrical signal, this signal is compared with an electrical signal whose duration represents the magnitude of the indicated flow rate. The latter is controlled by a signal representing the difference in duration of the compared signals.

Other objects and advantages of the invention will be apparent in the following explanation of one embodiment of the invention, it being understood that various modifications may be made in this embodiment and that other embodiments are possible without departing from the spirit of the invention and the scope of the appended claims.

In the drawings:

FIG. 1 is a view in central section of a fluid flowmeter, including magnetic flow rate sensing elements, which may be employed in the invention;

FIG. 2 is a sectional view taken on line 2—2 of FIG. 1;

FIG. 3 is a schematic representation of certain of the flow rate sensing elements in one condition of fluid flow;

Figure 4:
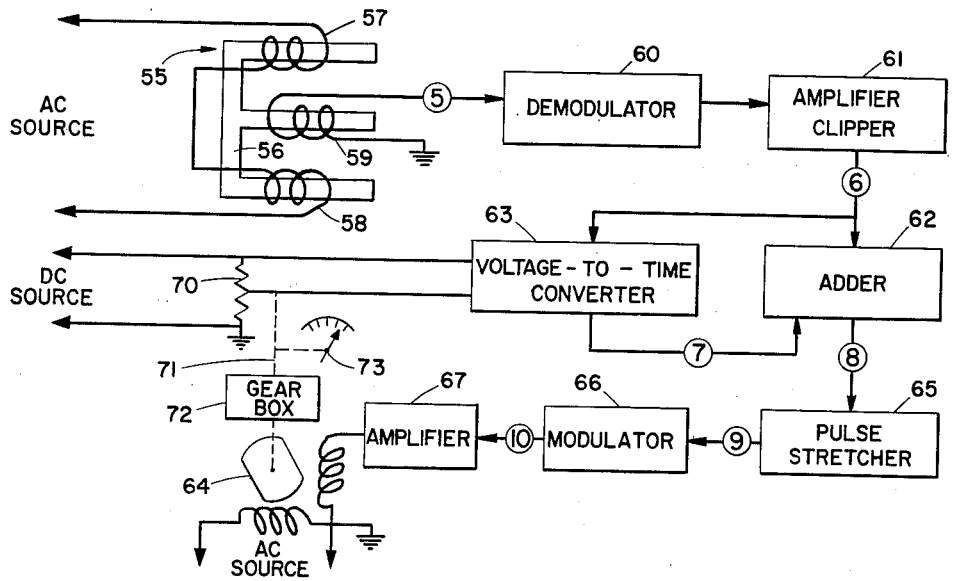
FIG. 4 is a schematic diagram of a rate of fluid flow indicating system embodying the invention.

The flowmeter in FIGS. 1 and 2 is encased in a generally cylindrical housing 10' having inlet and outlet ends 11 and 12, respectively, of reduced diameter. Within the housing toward the inlet end is a flow straightening structure designed to confine the flow of incoming fluid so that the fluid particles have zero average rotational component of velocity as they pass toward the other elements within the meter. This structure comprises concentric cylinders 14 and 15 connected by radially extending straightening vanes 16 which are spaced around the outer periphery of cylinder 14 and the inner periphery of cylinder 15 to form longitudinal flow passages 17. The inner cylinder 14 is sealed by an integrally formed dome 18 at its upstream end and by a motor mounting plate 19 threaded into its downstream end.

A drive motor 20 is disposed within the cylinder 14 where it is held by attachment to motor mount 19, its shaft 22 extending through a sealing bushing centrally of the motor mount. The opposite end of the shaft is of reduced diameter and extends into a bearing carried centrally by a bearing mount 23 extending across the inner diameter of the housing 10' adjacent its outlet end 12. Openings 25 in bearing mount 23, whose dimensions and spacing are advantageously like the flow spaces 17 as shown, permit egress of the fluid.

A driver 30 and an impeller 31 are housed within casing 10' in the space between the flow straightening structure and bearing mount 23. The driver 30 is cup-shaped and has a boss 32, extending inwardly in the cup from the central portion of its bottom, forming a hub for the motor shaft 22 to which it is fixed by any convenient means, as by being press fitted onto shaft 22 as shown.

The impeller 31 is disposed within the cup-shaped driver 30. It comprises inner and outer cylinders 34 and 35 connected by radially extending blades 36 spaced around the outer periphery of cylinder 34 and the inner periphery of the outer cylinder 35, as best illustrated in FIG. 2, to form flow passages 37. Advantageously, passages 37 of the impeller, passages 17 of the flow straightening structure, openings 25 of bearing mount 23, and openings 40, formed in the bottom wall of the driver 30, are alike in size and spacing and are concentric with and at the same radial distance from the axis of motor shaft 22, as shown.

Impeller 31 includes a hub 41 connected by spokes 42 to inner cylinder 34 and rotatably mounted on motor shaft 22 by a bushing 43. The impeller is connected to driver 30 by a spring such, for example, as spring 45 which is flat and coiled, extending from a connection to inner cylinder 34 of the impeller at one end to a connection to hub 32 of driver 30 at its other end.

Upon energization of motor 20, its shaft 22 and driver 30 are rotated at motor speed. Because of its connection to driver 30 through spring 45, impeller 31 is also rotated at the same speed, but if some force is applied to retard rotation of impeller 30 it will lag the driver in rotation, winding or unwinding spring 45 until the force stored in the spring is equal to the impeller retarding force. Thus the impeller will be angularly or rotationally displaced relative to the driver 30 through an angle which depends upon the magnitude of the retarding force and the spring rate of spring 45. Advantageously the spring is linear, as shown, whereby the displacement angle varies directly with retarding force.

Fluid, flowing through the meter through inlet 12, passages 17 and 37 and openings 40 and 25 to outlet 12, presents such a retarding force to the impeller 31. The fluid, which has zero rotational velocity as it passes through passages 17, is accelerated rotationally upon passing into impeller passages 37. By Newton's law the impeller experiences a retarding force equal to the mass of the fluid which is accelerated in unit time times its acceleration. Since the fluid has zero initial rotation and is accelerated to the rotational velocity of the impeller, the retarding force equals fluid mass times impeller speed divided by unit time.

Means are provided for sensing the magnitude of this angle. In the embodiment selected for illustration, a first armature 50 of magnetic material is secured by any convenient means to the outer surface of the impeller 31 and a second armature 51 of magnetic material is secured by any convenient means to the outer surface of driver 30, so that armature 51 is concentric with and, advantageously, overlies the armature 50, as shown. Neither armature is continuous but each has a discontinuity, in the form of a gap, so that it forms a segment of a circular ring or cylinder.

Figure 5:
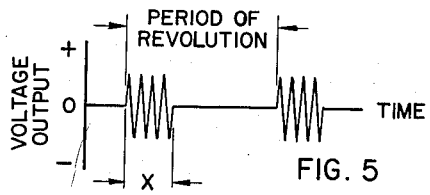
FIGS. 5 through 10 are graphs showing the variation in time of the voltages appearing at correspondingly numbered points in the system shown in FIG. 4.
Figure 8:
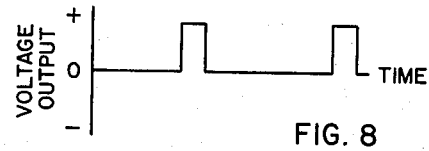
Figure 6:
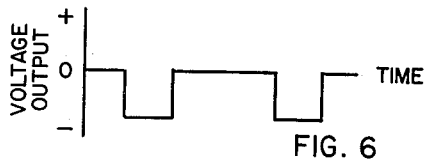
Figure 9:
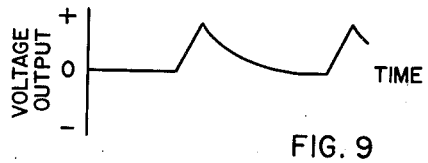
Figure 7:
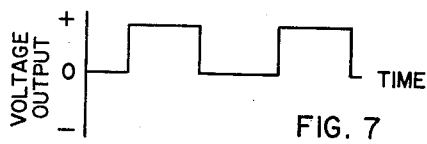
Figure 10:
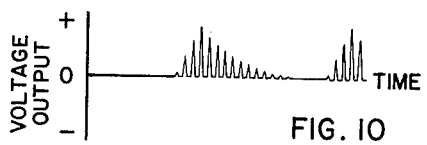

When it is desired to provide a signal whose duration is a direct measure of the fluid flow rate or the relative angular displacement between the impeller and driver, the armatures 50 and 51 are oriented so that when flow rate or relative driver-impeller displacement angle is zero, one armature is disposed opposite the gap in the other, the gap of one ending on the radial line where the other begins as illustrated in FIG. 5.

When motor 20 is energized and when fluid flow rate is zero, the impeller 31 will not be displaced with respect to driver 30. Consequently as the impeller and driver rotate to rotate armatures 50 and 51, one or the other of the armatures has a continuous portion passing any position adjacent their paths of rotation throughout the entire revolution of the armatures. But if fluid is made to flow through the flowmeter at a given rate, the impeller 31 will be displaced relative to the driver 30 by some angle $x$ displacing armature 50 counter-clockwise relative to armature 51 by angle $x$ and opening a gap in the joint magnetic influence of armatures 50 and 51 equal to the angle $x$.

Thus as the armatures rotate past a fixed position adjacent their path of travel they will jointly exert a continuous magnetic influence at that position during each revolution except for that period during which the gap in magnetic influence is passing that position.

Means are employed to provide a signal during the period when both elements have a discontinuous portion passing that position. In this case, the means comprises a magnetic pickup such as the pickup or sensor 55 illustrated. This device comprises an E-shaped core 56 having magnetizing windings 57 and 58 around its outer legs and a pickup winding 59 coiled about its center leg. The core is mounted in a well 60 formed on the outer surface of casing 10 adjacent the rotational path of magnetic armatures 50 and 51.

Windings 57 and 58 are wound in like direction whereby the magnetism they induce in core 56 tends to cancel in the center leg. If windings 57 and 58 have like magnetic effect, the center leg magnetism will be entirely cancelled when the gap of both armatures is opposite core 56 and no voltage will appear across winding 59 until one of armatures 50 or 51 is rotated opposite the core.

In certain applications it is desirable that a voltage be induced in winding 59 only when the gap of both armatures is opposite core 56. This can be accomplished by making winding 57 of fewer turns than winding 58, as shown, or otherwise reducing the magnetic effect of winding 57 so that the magnetism in the center leg is cancelled only when one or both of armatures 50 or 51 is opposite core 56. Then the center leg will be unbalanced and a voltage will be induced across winding 59 when the gap of both armatures is opposite core 56. The apparatus illustrated is so arranged.

The armatures 50 and 51 may be magnetized but need not be, and advantageously are not, magnetized, as shown. Of course the case 10', driver 40, and impeller 31 are formed of non-magnetic materials at least in those portions proximate to the pickup.

It is to be noted that the angle $x$ varies not only with mass rate of fluid flow but also with the speed of rotation of the impeller since the retarding force is a joint function of mass flow rate and impeller speed. However, the time required for rotation of the armatures through the angle $x$ is equal to impeller (and driver) speed divided by that angle. Comparison of these two relationships shows that the time for rotation of the armatures through angle $x$, and so the time duration of winding 59 output, is independent of impeller speed and varies only as mass rate of fluid flow.

Variations in the electrical signal output of pickup with time are illustrated in FIG. 5 as they occur at point 5 in the diagram of FIG. 4.

Means are provided for providing an indication of the mass rate of fuel flow in accordance with the duration of the signals at point 5. The indication may be mechanical or visual or both, as illustrated in FIG. 4. Advantageously this means comprises means for comparing with the time duration signal, a signal which commences at the same time and ends at a time proportional to the indicated flow rate. The difference in duration of these signals being represented by a signal which drives the indicator. In the preferred form illustrated the signal at point 5 is rectified and converted to a substantially square wave in a demodulator 60 whose output is amplified and clipped in an amplifier-clipper 61 to provide an output at point 6 which is a square wave of fixed amplitude and of the same duration as the signal at point 5. This square wave is applied to an adder 62 and a voltage-to-time converter 63. In the converter it initiates production of a square wave of the same fixed amplitude which lasts for a period determined by the indication of an indicator 64. The square wave output of the converter 63, as it appears at point 7 is also applied to adder 62.

Adder 62 compares the point 6 and point 7 square waves to produce a signal proportional to their time difference and, in the case of a system intended to measure flows in both directions, indicative of which was longer in duration. It makes little difference whether the square waves of points 5 and 7 are of like polarity and are subtracted in adder 62 or are of opposite polarity and are added in adder 62. It is a matter of convention in either case to consider the square waves to be opposite in polarity and to refer to the comparison unit 62 as an adder, and the convention is adhered to here.

The output signal from the adder 62 drives the indicator which may, as shown, be an electric motor whose rotational position indicates the mass rate of fluid flow. An alternating current motor is preferred, rotor position being controlled in accordance with the relative energization of a pair of windings. The energization of one of these windings is fixed whereas the other is energized in proportion to the duration of the adder output appearing at point 8. This signal is transformed into a form suitable for energizing the indicator motor 64 by stretching in a pulse stretcher 65, modulating the stretched pulse, appearing at point 9, in a modulator 66 and amplifying the modulated signal, appearing at point 10' in an amplifier 67 whose output is applied to indicator motor 64.

Advantageously the indicator motor 64 is energized by alternating or pulsating currents and the motor illustrated is so energized. One winding 68 is connected across a fixed A.C. source and the other winding 68 is energized by the output signal from amplifier 67. It will be understood that if a direct current motor is employed, modulator 66 will be omitted and the motor windings energized by continuous currents.

Voltage-to-time converters are square wave generators in which the duration of the square wave, after initiation by an electrical signal, is determined by the magnitude of a voltage. In the voltage-to-time converter 63 illustrated, the initiating signal is the voltage rise in the square wave supplied by clipper amplifier 61. The time duration signal is supplied by a voltage source across a voltage adjusting element such as the potentiometer 70 shown. The voltage is that voltage appearing between the tap and top end of the potentiometer and it varies in accordance with the rotational position of the indicator motor shaft because the latter drives the potentiometer tap, as represented by the dashed line 71, through a suitable gear box 72. The dial pointer 73 is also driven by the shaft of motor 64 to provide a visual indication of mass rate of fuel flow.

Examples of demodulator, amplifier clipper, adder, voltage-to-time converter, pulse stretcher, modulator and amplifier circuits may be found in "Handbook of Industrial Electronics Circuits" by John Markus and Vin Zeluff, first edition 1948 published by McGraw-Hill Book Company, Inc. of New York, N.Y., at the pages hereinafter indicated.

The demodulator 60 may comprise an ordinary rectifier and filter circuit such as those used in unidirectional power supplies. An example is shown in the power supply section in the first illustration on page 1 of the reference. "Handbook of Industrial Electronics Circuits." The amplifier clipper 61 may comprise either the saturation type or the shunt type. Examples of both are described on page 92 of the reference. The adder 62 is an amplifier having dual input circuits connected so that the signal current from both inputs may flow together in the grid resistor of the amplifier tube. An example is shown in the first stage of the circuit appearing at page 17 of the reference. The voltage-to-time converter is a square wave generator in which generation of the wave is initiated by an electrical signal and is terminated when a capacitor is charged to a predetermined voltage. The time required to reach the predetermined voltage is determined by adjustment of the voltage applied to the capacitor charging circuit. Such converters are common in oscilloscopes having provision for synchronization by external signals. An example is shown at the top of page 31 of the reference. The output of the amplifier clipper 61 of FIG. 4 is used as the synchronizing pulse. The pulse stretcher 65 may be the type used with peak-reading voltmeters to permit measurement of short duration pulses. A suitable pulse stretcher is shown at the top of page 127 of the reference.

The modulator or chopper 66 is a circuit arrangement for interrupting an electrical signal at a relatively high frequency. An example of such a device is shown at page 75 of the reference. It comprises that portion of the circuit through tube 1620. An example of a simplified modulator better suited to use in the invention is shown and described at pages 13–24, "Handbook of Semiconductor Electronics" by Lloyd P. Hunter, first edition 1956, published by McGraw-Hill Book Company, Inc. of New York.

The amplifier 67 is an ordinary audio amplifier circuit and the reference shows many examples including one in the middle of page 14.

We claim:
1. A rate of flow indicating system, comprising means sensitive to rate of flow for providing a first signal of duration representative of the rate of flow, signal responsive indicating means for indicating the rate of fluid flow, means for providing a second signal beginning at the time of beginning of said first signal and of a duration corresponding to the indication of said indicating means, comparison means for deriving a third signal proportional to the difference in duration of said first and second signals, and means for applying said third signal to said indicating means, said indicating means being adjustable in response to said third signal to lengthen or shorten the time duration of said second signal to correspond to that of said first signal.

2. The invention defined in claim 1 in which said first and second signals are unidirectional electrical signals alike in amplitude but opposite in polarity, and in which said comparison means includes means for adding said first and second signals to produce a unidirectional signal of polarity indicative of which of said first and second signals was of longer duration.

3. A rate of fluid flow indicating system, comprising means sensitive to rate of fluid flow for providing an alternating electrical signal whose time duration is proportional to the rate of fluid flow and substantially longer than its period of alternation, means sensitive to said signal for providing a first unidirectional electrical signal of fixed amplitude for the duration of said alternating signal, signal responsive indicating means for providing a unidirectional second signal of said fixed amplitude commencing at the time of beginning of said first unidirectional signal and of a duration corresponding to the indication of said indicating means, means for comparing said first and second unidirectional signals for providing a third signal proportional to the time difference therebetween, and means for applying said third signal to said indicating means, said indicating means being adjustable in response to said third signal to lengthen or shorten the time duration of said second signal to correspond to that of said first signal.

References Cited in the file of this patent
UNITED STATES PATENTS

| | | |
|---|---|---|
| 1,957,681 | Thompson | May 8, 1934 |
| 2,733,392 | Wright | Jan. 31, 1956 |